T. H. PRINCE.
PUNCTURE GUARD FOR PNEUMATIC TIRES.
APPLICATION FILED NOV. 29, 1907.
979,699.
Patented Dec. 27, 1910.
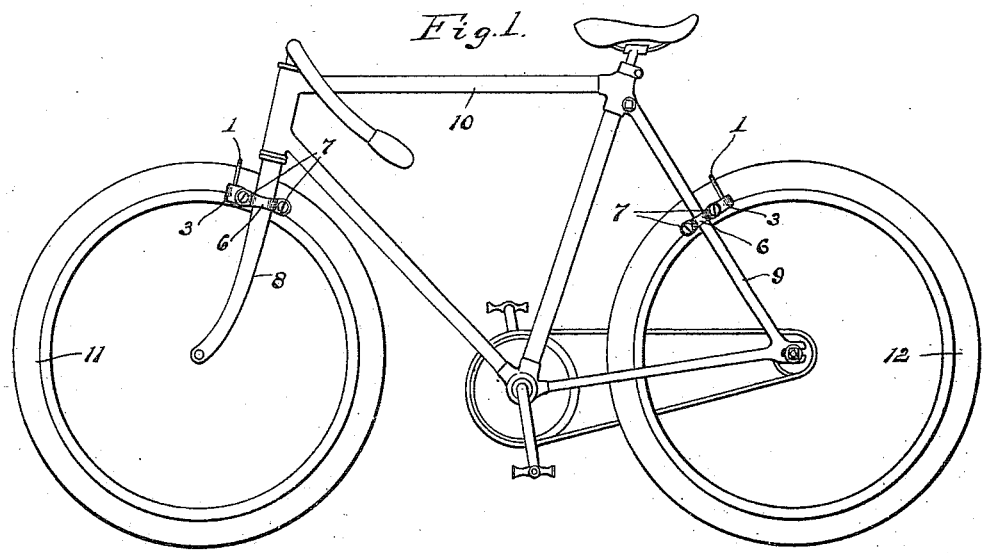
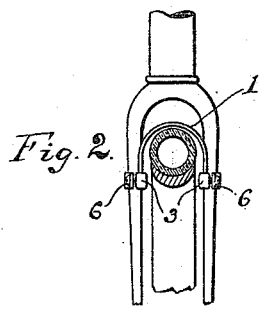
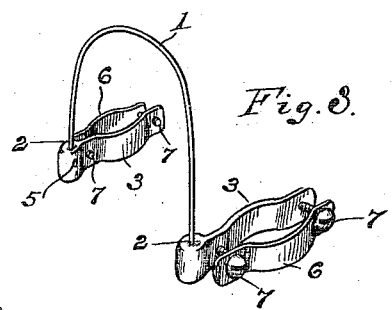
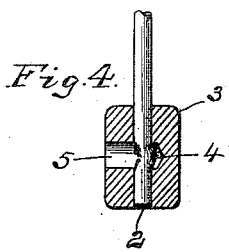
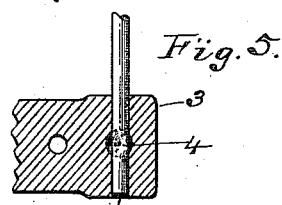
WITNESSES:
INVENTOR
Thomas H. Prince
By
Attorneys

UNITED STATES PATENT OFFICE.

THOMAS H. PRINCE, OF DETROIT, MICHIGAN.

PUNCTURE-GUARD FOR PNEUMATIC TIRES.

979,699.  Specification of Letters Patent.  Patented Dec. 27, 1910.

Application filed November 29, 1907. Serial No. 404,208.

*To all whom it may concern:*

Be it known that I, THOMAS H. PRINCE, a citizen of the United States of America, residing at Detroit, in the county of Wayne and State of Michigan, have invented certain new and useful Improvements in Puncture-Guards for Pneumatic Tires, of which the following is a specification, reference being had therein to the accompanying drawings.

A great number of punctures in pneumatic tires are caused by tacks, pieces of glass or the like, which are picked up by the tire without at first piercing it, and are carried around until finally forced clear through by again coming in contact with the road.

This invention relates to a puncture guard for pneumatic tires adapted to remove articles thus picked up by the tire tread, and consists in the matters hereinafter set forth, and more particularly pointed out in the appended claim.

As herein illustrated, the invention is shown attached to a bicycle, although it may, of course, be used for any vehicle wheel.

In the drawings, Figure 1 is a view in elevation of a bicycle equipped with guards embodying features of the invention. Fig. 2 is a view in detail in front elevation of a guard attached to the front forks of the bicycle. Fig. 3 is a view in detail of a detached guard. Fig. 4 is a view in detail, partially in section, showing the connection of a clip jaw with the end of a loop. Fig. 5 is a detail view in section at right angles to Fig. 4.

Referring to the drawings, 1 indicates a light bar or rod of spring metal, preferably cylindrical, bent into a U of slightly greater span than the tire it is adapted for, with its ends 2 each secured in a socket in a clip jaw 3, preferably of cast metal, by expanding, offsetting or pitting the rod as at 4, with a punch inserted in a transverse aperture 5 so that the off-set or expanded portion enters a pocket 8 in the socket wall opposite the aperture through which the off-setting tool is inserted. An opposite mating jaw 6 with binding screws 7 completes the clip, the form of which may be varied for convenient attachment to any vehicle frame.

In operation, loops are secured by proper adjustment of the clips as around the forward fork 8 and rear fork 9 of a bicycle frame 10 to just clear the treads of the front tire 11 and rear tire 12. Each loop intercepts and usually extracts any article partially embedded in the surface, while anything so embedded as not to be thus removed, attracts the rider's or operator's attention by clicking against the guard, thus giving warning before the tire is punctured.

What I claim as my invention is:—

Puncture guards for pneumatic tires of a bicycle provided with front and rear forks each consisting of a pair of corresponding apertured metal jaws whose proximate faces conform to and grip a fork arm, screws passing loosely through the apertures in the outer jaw of each pair and engaging screw-threaded apertures in the inner jaw, the corresponding ends of the inner jaws of each pair of clips being enlarged and provided with a socket substantially parallel to the fork and with a transverse aperture opening into the socket and a pocket in the socket wall opposite the aperture, and a cylindrical spring metal rod bent into a U-loop spanning a tire tread with each end inserted in the socket of a clip jaw and permanently offset into the pocket opposite the transverse aperture.

In testimony whereof I affix my signature in presence of two witnesses.

THOMAS H. PRINCE.

Witnesses:
C. R. STICKNEY,
OTTO F. BARTHEL.